(12) United States Patent
Kunda et al.

(10) Patent No.: US 7,082,830 B2
(45) Date of Patent: Aug. 1, 2006

(54) PHYSICAL QUANTITY SENSOR CAPABLE OF OUTPUTTING TIME-SERIAL SIGNAL INDICATIVE OF PLURAL RANGES OF PHYSICAL QUANTITY

(75) Inventors: Tomohito Kunda, Okazaki (JP); Yasuki Shimoyama, Anjo (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/771,500

(22) Filed: Feb. 5, 2004

(65) Prior Publication Data

US 2004/0177691 A1 Sep. 16, 2004

(30) Foreign Application Priority Data

Feb. 6, 2003 (JP) .............................. 2003-029599
Nov. 28, 2003 (JP) .............................. 2003-399932

(51) Int. Cl.
*G01P 15/08* (2006.01)
*G01P 21/00* (2006.01)

(52) U.S. Cl. ..................... 73/514.35; 73/1.38; 73/1.62; 73/1.88; 702/104

(58) Field of Classification Search ................ 73/1.37, 73/1.38, 1.62, 1.88, 497, 504.02, 510, 514.01, 73/514.35, 654; 702/104
See application file for complete search history.

(56) References Cited

U.S. PATENT DOCUMENTS

| 4,200,925 | A | * | 4/1980 | Cushman ....................... 700/9 |
| 5,396,439 | A | * | 3/1995 | Yamada .................... 73/514.33 |
| 6,701,788 | B1 | * | 3/2004 | Babala ......................... 73/649 |

FOREIGN PATENT DOCUMENTS

| JP | 9-236617 | 9/1997 |
| JP | 10-282136 | 10/1998 |

* cited by examiner

*Primary Examiner*—John E. Chapman
(74) *Attorney, Agent, or Firm*—Posz Law Group, PLC

(57) ABSTRACT

A physical quantity sensor detecting physical quantity, such as acceleration or angular velocity, is provided and mounted on, for example, a vehicle. The sensor has a physical quantity transducer and the first to third circuits. The transducer senses physical quantity acting in a direction determined with respect to a predetermined detection axis of the transducer to output a detection signal corresponding in level to the physical quantity. The first circuit receives the detection signal and output a first physical quantity signal depending in level on the detection signal. The second circuit produces a second physical quantity signal from the first physical quantity signal, the second physical quantity signal being larger in magnitude the first physical quantity signal. The third circuit receives the first and second physical quantity signals and outputs a signal consisting of the first and second physical quantity signals alternately selected and lined up sequentially in time.

18 Claims, 9 Drawing Sheets

PHYSICAL QUANTITY SENSOR CAPABLE OF OUTPUTTING TIME-SERIAL SIGNAL INDICATIVE OF PLURAL RANGES OF PHYSICAL QUANTITY

BACKGROUND OF THE INVENTION

1. Technical Field

The present invention relates to a physical quantity sensor sensing a physical quantity and outputting an electrical signal whose level corresponding to a level of the physical quantity, and in particular, to a physical quantity sensor equipped with a single physical quantity transducer to output a signal indicative of a plurality of ranges of physical quantity.

2. Related Art

At present, life-saving automotive airbag systems have become very popular as means for occupant crash protection. One type of such automotive airbag systems is a side-impact airbag system to protect occupants against a collision impact acting on the right or left side of a vehicle.

The side-impact airbag system is equipped with a left side-impact airbag and a right side-impact airbag. It is required that both of the left and right side-impact airbags operate against shocks acting on a vehicle on the left and right sides thereof, respectively, without introducing errors and without fail.

In order to achieve the above steady operation, acceleration sensors are mounted on a vehicle to detect a collision shock as a physical quantity. A plurality of acceleration ranges are previously given to determine a result to be detected by those acceleration sensors. By way of example, two acceleration ranges are used; one is given to determine a larger-amplitude signal that corresponds to a direct shock occurring when the vehicle causes a collision and the other is given to determine a relatively smaller-amplitude signal that corresponds to a secondary shock caused secondarily by the direct shock but reduced in amplitude, due to being more or less absorbed by the vehicle body during the transmission of the direct shock therethrough.

For example, when a collision occurs on the right side of a vehicle, a vehicle-right-located acceleration sensor (right main sensor) detects a direct shock described above and other sensors other than the right sensor, for example, a vehicle-central-located or vehicle-left-located acceleration sensor (right safing sensor) detects a secondary shock. This detection leads to a determination that there occurred a heavier collision on the right side of the vehicle. Therefore, in this case, only the right side-impact airbag is operated forcibly. Hence it is surely prevented that the right side-impact airbag, which is located on the vehicle's shock-applied side, does not operate and/or the left side-impact airbag, which is arranged to be opposed to the right one, may operate erroneously.

In the conventional side-impact airbag system, not only a pair of main sensors to be disposed on the right and left sides of a vehicle but also one or more safing sensor should be arranged at each of a plurality of locations of the vehicle. Such plural locations exist in the lateral direction (corresponding to a detection-axis direction of each acceleration sensor) at each of frontal, central and back parts of the vehicle's room. This arrangement increases the number of acceleration sensors and the amount of harness to an ECU (Electrical Control Unit), and results in the problem that mounting the side-impact airbag system to a vehicle is largely limited concerning mounting locations.

One solution to the above problem is detecting different magnitudes of acceleration in the same detection-axis direction. This detection can be realized if each acceleration sensor detects accurately an acceleration falling in each of a plurality of ranges. It is thus understood that such a way for the detection will allow a side-impact airbag system to reduce the number of acceleration sensors as a whole.

The idea that uses one acceleration sensor for a plurality of different applications has been taught by Japanese patent laid-open publication No. HEI10 (1998)-282136. This publication discloses a system in which a single acceleration sensor detects an acceleration level and outputs a plurality of types of acceleration signals, of which detection ranges differ from each other and of which response frequency range characteristics also differ from each other. The plural different applications consist of for instance an ABS (Anti Lock Brake System) and an on-vehicle airbag system.

However, the system disclosed by the above publication has a problem of not being able to detect, in particular, a lower-level acceleration with precision. This problem derives from the fact that, in the above system, an output from the signal acceleration transducer is subjected to amplification at two amplifiers in turn and a drift signal component included in the transducer output signal is also amplified as well.

This kind of problem is also true of other physical quantity sensors other than the acceleration sensor, which are for example sensors for an angular velocity and a pressure relating to vehicle's driving behaviors.

SUMMARY OF THE INVENTION

The present invention has been made with due consideration to the foregoing difficulties, and an object of the present invention is to provide a compact physical quantity sensor equipped with a single physical quantity transducer to detect a physical quantity and capable of outputting a plurality of types of signals indicative of the physical quantity in a plurality of different level ranges (hereinafter simply referred to as ranges).

In order to realize the above object, as an aspect of the present invention, there is provided a physical quantity sensor. The sensor comprises a physical quantity transducer sensing a physical quantity acting on the physical quantity transducer to output an electrical detection signal corresponding in level to a magnitude of the physical quantity; a first circuit configured to receive the detection signal and output a first physical quantity signal depending in level on the detection signal; a second circuit configured to produce a second physical quantity signal from the first physical quantity signal, the second physical quantity signal being larger in magnitude the first physical quantity signal; and a third circuit configured to receive both of the first and second physical quantity signals and output a single signal consisting of the first and second physical quantity signals alternately selected and lined up sequentially in time.

As described above, the first and second physical quantity signals are produced from the same transducer and are produced into the single time-serial signal composed of the first and second physical quantity signals. Because both the first and second physical quantity signals are in different magnitude ranges, the single produced signal is provided as a signal having different two ranges.

It is preferred that the first circuit is a first amplifier amplifying the detection signal at a first gain given to the first amplifier to produce the first physical quantity signal and the second circuit is a second amplifier amplifying the first physical quantity signal at a second gain given to the second amplifier.

Thus the first physical quantity signal is produced by amplifying the detection signal at the first gain and the second physical quantity signal is produced by amplifying the first physical quantity signal at the second gain. That is, the first physical quantity signal is subjected to amplification at a gain that is a product of the first and second gains. The second physical quantity signal can be made easier.

By way of example, the third circuit is provided with a multiplexer configured to alternately select the first and second physical quantity signals at predetermined cycles and an A/D converter performing an A/D conversion on the first and second physical quantity signals, thereby the single signal being easily outputted in the form of a single digital signal.

It is also preferred that the sensor comprises a drift correcting circuit configured to remove a drift signal component from the second physical quantity signal.

Because the drift signal component is positively removed from the second physical quantity signal, the single signal outputted from the third circuit is raised in signal accuracy. The reason is that the original first physical quantity signal has relatively less influence of drift signal components and the second one undergoes the positive drift removal.

In this configuration, by way of example, the third circuit is provided with a multiplexer configured to alternately select, at predetermined cycles, the first physical quantity signal and the second physical quantity signal from which the drift signal component has been removed and an A/D converter performing an A/D conversion on both of the first physical quantity signal and the second drift-removed physical quantity signal, thereby the single signal being outputted in the form of a single digital signal.

By way of example, the drift correcting circuit is a high-pass filter connected to an output terminal of the second amplifier and configured to pass only signal components of the second physical quantity signal which are higher than a predetermined frequency. The high-pass filter makes it possible to pass only signal components of which frequencies are higher than a drift signal component to be removed, which is slowly changed in the second physical quantity signal. Thus the high-pass filter is able to steadily remove the drift component from the second physical quantity signal.

Preferably, the second amplifier is a differential amplifier and the high-pass filter is located to have an output signal therefrom negatively fed back to a reference input of the differential amplifier. This differential amplification is also produce a relatively lower-level sensor signal, that is, the second physical quantity signal.

The physical quantity transducer is an acceleration sensor detecting acceleration acting on a vehicle or an angular velocity sensor detecting angular velocity acting on the vehicle.

As another aspect of the physical quantity sensor according to the present invention, the first to third circuits and the drift correcting circuit are formed as a semiconductor circuit on a one semiconductor chip and the physical quantity transducer is mounted on the semiconductor chip, the semiconductor chip being enclosed with a package with the physical quantity transducer placed therein. This configuration allows the sensor to be incorporated in the one sensor package, thereby making the sensor more compact.

BRIEF DESCRIPTION OF THE DRAWINGS

Other objects and aspects of the present invention will become apparent from the following description and embodiments with reference to the accompanying drawings in which.

DETAILED DESCRIPTION OF PREFERRED EMBODIMENTS

With reference to the accompanying drawings, preferred embodiments of the present invention will now be described.

(First Embodiment)

Figure 1A:
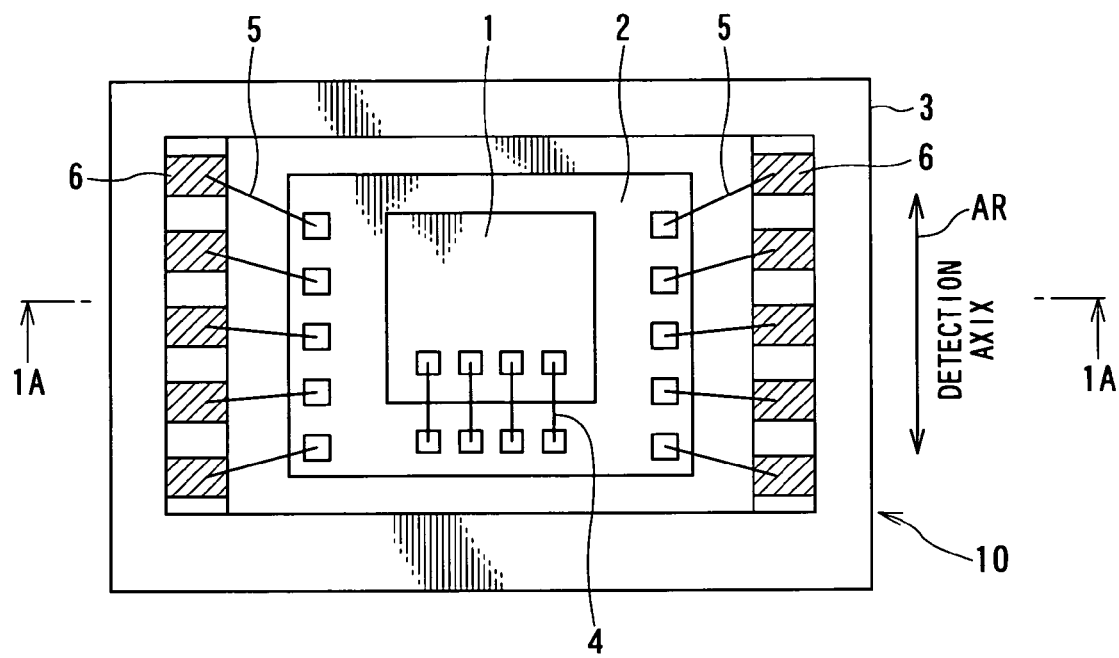
FIG. 1A is a plan view showing an internal structure of a package in which an acceleration sensor serving as the physical quantity sensor according to the present invention is mounted.
Figure 1B:
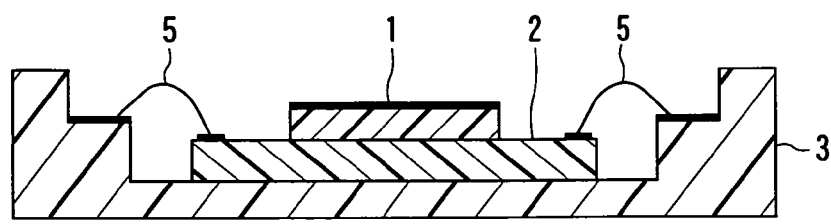
FIG. 1B is a sectional view taken along a 1A—1A line shown in FIG. 1A.
Figure 2:
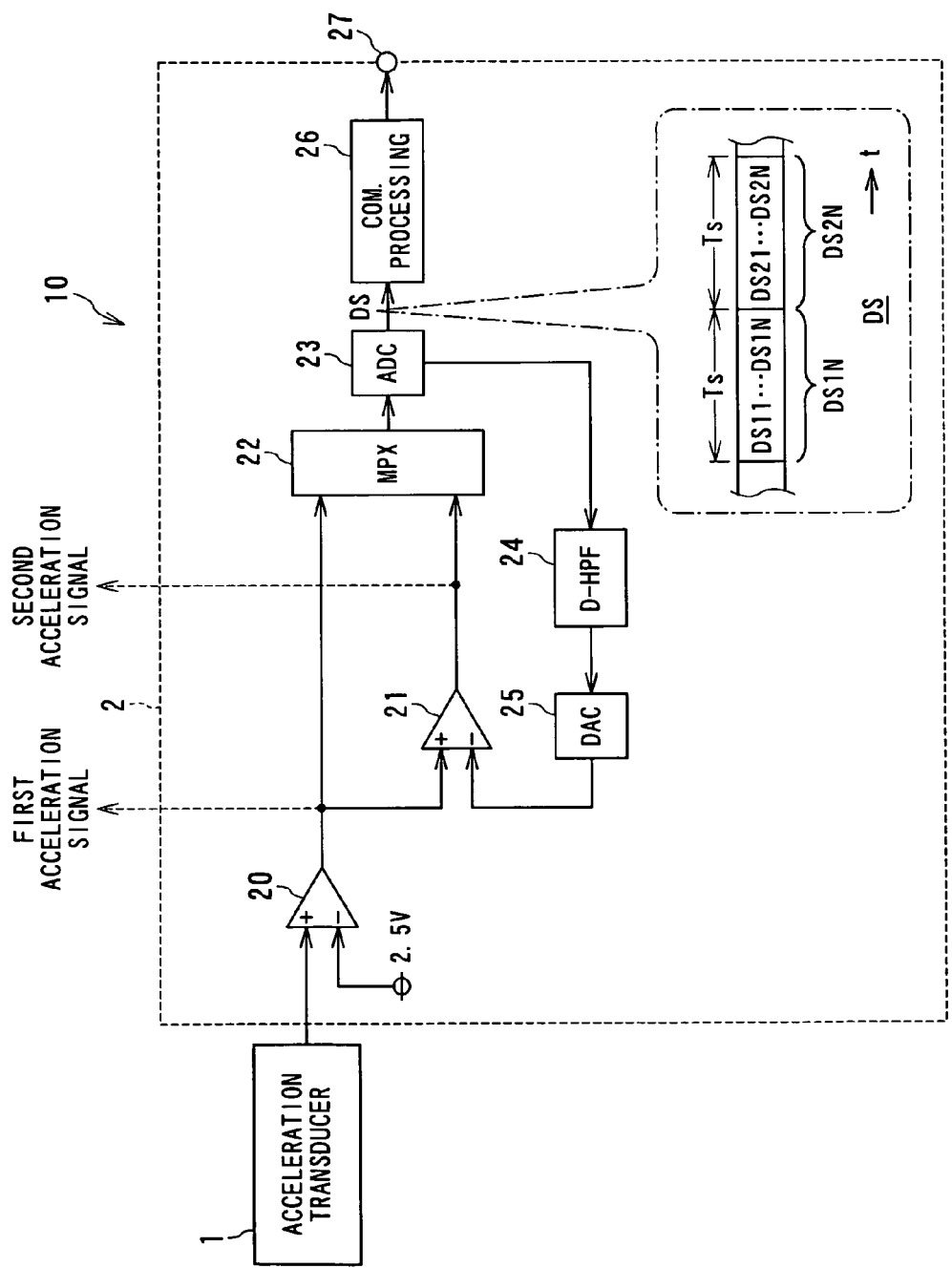
FIG. 2 is a block diagram showing the circuitry of the acceleration sensor according to the first embodiment.
Figure 3:
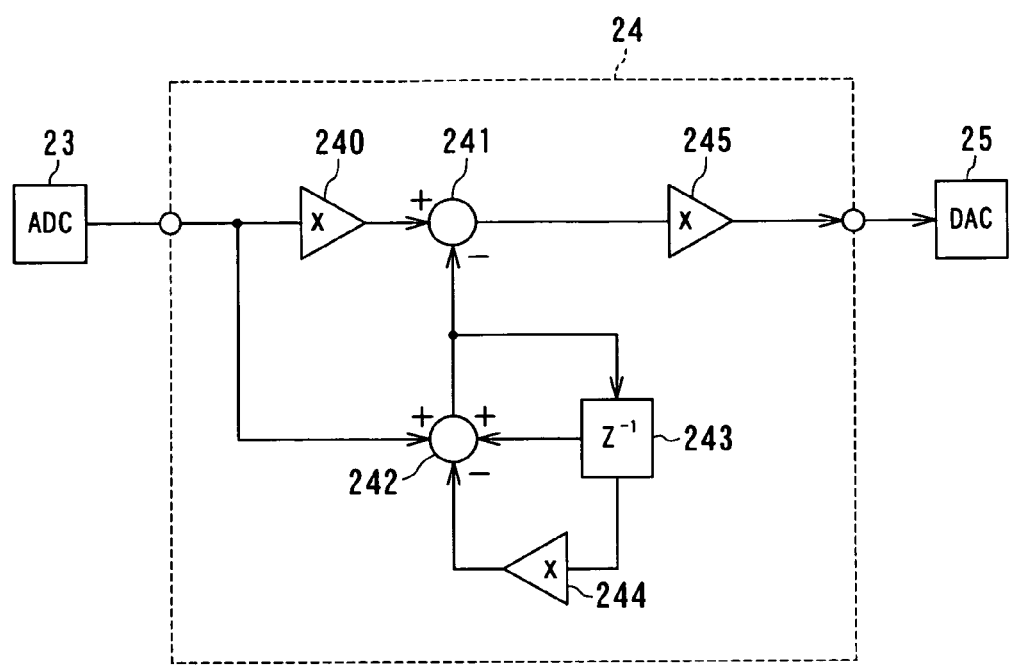
FIG. 3 is a functional block diagram representing a digital high-pass filter employed by the acceleration sensor.

Referring to FIGS. 1 to 3, a first embodiment of a physical sensor according to the present invention will now be described, in which the physical sensor is realized, by way of example, as an acceleration sensor employed by an on-vehicle side-impact airbag system.

FIGS. 1A and 1B show a package 3, which is a physical form of an acceleration sensor 10, while FIG. 2 shows the entire circuitry of the acceleration sensor 10 formed on a semiconductor chip 2 enclosed by the package 3.

In the inner space of the package 3, the semiconductor chip 2 is accommodated, and a single acceleration transducer 1 is mounted on the semiconductor chip 2. On the chip 2, a semiconductor circuit for various circuits is formed.

The acceleration transducer 1 is designed as a semiconductor type of transducer and disposed to have a predetermined detection axis shown by arrows AR in FIG. 1A. The acceleration transducer 1 senses an acceleration component caused in the detection axis AR and outputs an analog-amount electrical signal corresponding in level to the acceleration component, while still having a wide dynamic range that affords to measure acceleration signals in both a first detection range (e.g., max. 200G) required for a main sensor and directed to the determination of operations of side-impact airbags and a second detection range (e.g., max. 50G) required for a safing sensor. Electrical connections between the acceleration transducer 1 and the semiconductor chip 2 are carried out by wires 4, as pictorially shown in FIG. 1A.

On the semiconductor chip 2, the semiconductor circuit that serves as a circuit for processing an output signal from the acceleration transducer 1 is produced as a semiconductor circuit pattern. Wires 5 electrically connect terminal 6 formed on the package 3 and terminals formed on the chip 2, as pictorially shown in FIG. 1A.

Because both the acceleration transducer 1 and the semiconductor chip 2 made compact, the outer sizes of the package 3 can be reduced to as small as "60×60×20" [mm] in length by width by height.

The semiconductor circuit formed on the semiconductor chip 2 has circuitry exemplified by a block diagram shown in FIG. 2. This semiconductor circuit is provided with a first amplifier 20, a second amplifier 21, a multiplexer (MPX) 22, an A/D converter (ADC) 23, a digital type of high-pass filter (D-HPF) 24, a D/A converter (DAC) 25, and a communication processing circuit 26 connected to a sensor output terminal 27.

Of these components, in comparison with the configurations of the present invention, the first amplifier 20 serves as the first circuit, the second amplifier 21 serves as the second circuit, the multiplexer 22 and A/D converter serve as the A/D converting circuit as the third circuit, and the high-pass filter 24 and D/A converter 25 serve as the drift correcting circuit (or "zero-acceleration correcting circuit).

An output signal from the semiconductor type of acceleration transducer 1 is fed to the first amplifier 20, which is configured as a differential amplifier to which a reference potential of 2.5 [V] is applied. Hence, the output signal from the transducer 1 is subjected to differential amplification based on the reference potential of 2.5 [V]. In the present embodiment, the first amplifier 20 is configured to have a gain of 7, so that an adjustment is made such that the output of the first amplifier 20 reaches a full scale when the acceleration generating at the vehicle is 150G.

The output signal from the first amplifier 20 is fed as a first acceleration signal to a noninverting input terminal of the second amplifier 21, which is formed into a differential amplifier as well, and one of the two input terminals of the multiplexer 22. Thus the output signal from the first amplifier 20 has an amount obtained when the output signal from the acceleration transducer 1 is amplified at the gain of 7. This amplified signal is supplied to the noninverting input terminal of the second amplifier 21. To an inverting input terminal of the second amplifier 21 is applied a signal formed after A/D (Analog/Digital) conversion and D/A (Digital/Analog) conversion of an output signal of the second amplifier 21 itself, as will be detailed later. This signal application causes the output of the second amplifier 21 to be fed to its inverting input terminal in a negative feedback manner.

The second amplifier 21 has a gain of 7.5 serving as a second gain, and an adjustment is made to allow an output signal form the second amplifier 21 reaches its full scale when the acceleration generating at the vehicle is 20G. An output signal from the second amplifier 21 is fed, as a second acceleration signal, to the remaining input terminal of the multiplexer 22.

In the present embodiment, the first acceleration signal composed of the output of the first amplifier 20 (i.e., the signal to be inputted to the second amplifier 21) and the second acceleration signal composed of the output of the second amplifier 21 can be outputted selectively or at the same time as analog-quantity signals, as represented by dashed line arrows shown in FIG. 2.

The multiplexer 22 alternately activates its input terminal in a switching cycle of, for example, 250 μsec., so that an output signal from the multiplexer 22 to the A/D converter 23 is switched alternately one from the other between the two output signals from the first and second amplifiers 20 and 21. Hence, inputted to the multiplexer 22 are the first acceleration signal and the second acceleration signal, the first acceleration signal not only corresponding to an output of the first amplifier 20 in which the output of the acceleration transducer 1 is reflected but also being also an input signal to the second amplifier 21 and the second acceleration signal being formed by amplifying the first acceleration signal at a second gain at the second amplifier 21.

The A/D converter 23 operates as means for A/D conversion and outputs the converted signal. Specifically, the converter 23 A/D-converts, into a digital-amount signal, each output signal of the first and second amplifiers given every period of time based on the predetermined switching cycle. Moreover, the A/D converter 23 not only attaches to the converted signal a sign identifying the output signals from the first and second amplifiers one from the other but also outputs in series the sign-attached signals as two-range acceleration signals made up of a main sensor signal and a safing sensor signal.

The digital signal outputted from the A/D converter 23 is sent to a side-impact airbag ECU (not shown) via the communication processing circuit 26 and the sensor output terminal 27, both of which function as an interface to an external device.

The side-impact airbag ECU receives the two-range acceleration signals from the acceleration sensors 10 disposed on the right and left sides of the vehicle, separates the acceleration signals using the respective identification signs attached thereto to produce main sensor signals and safing sensor signals, and uses the main and safing sensor signals to determine the operations of the side-impact airbags.

For instance, the left side-impact airbag is forcibly operated (i.e., deployed), when the determination is made such that the main sensor signal from the acceleration sensor 10(L) (i.e., an output from the first amplifier 20) on the vehicle's left side is ON (equal to or higher than a threshold determined by the reference potential of 2.5 [V]) and at the same time, the main sensor signal from the acceleration sensor 10(R) on the vehicle's right side is OFF (lower than the threshold) and the safing sensor signal is ON (equal to or higher than a threshold).

The output signals from the A/D converter 23 also pass an extraction circuit (not shown) placed in the A/D converter 23. Thus, in the extraction circuit, of the output signals from the A/D converter 23, the identification signs are utilized to identify the digital output signal from the second amplifier 21 is identified. The identified digital output signal, which is referred to as the second digital signal, is outputted from the extraction circuit, that is, the A/D converter 23, and then sent to the digital high-pass filter (D-HPF) 24.

The digital high-pass filter 24 is formed into an IIR (Infinite Impulse Response) type of digital filter, of which functional configuration is exemplified by FIG. 3. As shown therein, this high-pass filter 24 is functionally provided with multipliers 240, 244 and 245, adders 241, 242, and a delay element 243. In this configuration, the digital high-pass filter 24 has a cut-off frequency of 0.1 Hz, which is set by adjusting the constants of the multipliers 240, 244 and 245.

An output signal from this digital high-pass filter 24 is supplied to the D/A converter 25, where the signal undergoes a D/A conversion to a corresponding analog signal. This converted analog signal is given to an inverting input terminal of the second amplifier 21, as shown in FIG. 2. All the digital high-pass filter 24, D/A converter 25, first and second amplifiers 20 and 21, multiplexer 22, A/D converter 23 and communication processing circuit 26 are formed on the semiconductor chip 2.

Hence, the digital high-pass filter 24 produces a signal of which frequency components lower than its cut-off frequency is removed from the output signal of the second amplifier 21. The second amplifier 21 amplifies, at the second gain, a differential input between the output signal of the first amplifier 20 and the above lower-component-removed output signal of its own.

In the acceleration transducer 1 and the circuitry elements formed on the semiconductor chip 2, particular factors such as drift due to changes in the temperature will cause signal levels to change slowly in time.

In other words, even when the transducer 1 senses no acceleration, a drift component flows slowly from the transducer 1 at a large time constant at any time and this drift signal component is mixed in the sensor detection signal. Because the first acceleration signal is produced from a relatively higher-level signal of the output from the transducer 1, the drift component signal is as small as negligible, compared to the first acceleration signal. By contrast, the second acceleration signal is produced from a relatively lower-level signal of the transducer output through amplification at a higher gain that is a product of the first and second gains. This means that the drift signal component is also amplified at the higher gain, so that it is no longer possible to neglect the drift signal component in the second acceleration signal. Hence, if the circuitry described in this embodiment is not employed, errors due to the drift become larger.

However, the present embodiment adopts, as described already, the circuitry in which drifts components are removed from the signal more amplified by the second amplifier 21, thus providing correction performed for the situation where the acceleration to be caused at the vehicle is zero (i.e., zero-acceleration). This enables the second amplifier 21 to output a low-level acceleration signal that is accurate and free of influences of the drifts.

As a result, the A/D converter 23 is allowed to perform A/D conversions, at almost the same precision, on both of the first acceleration signal DS1N and the second acceleration signal DS2N (refer to FIG. 2), the first acceleration signal DS1N being an output from the first amplifier 20, amplified at a relatively lower gain, and lesser in the affections from the drifts, while the second acceleration signal DS2N being free of drift components and an output of the second amplifier 21 further amplifying an output of the first amplifier 20.

In the present embodiment, the multiplexer 22 and A/D converter 23 constitutes an A/D converting circuit according to the present invention, the digital high-pass filer 24 and D/A converter 25 constitutes a drift correcting circuit (or "zero-acceleration correcting circuit).

As described above, the acceleration sensor 10 according to the present embodiment uses only the one acceleration transducer 1 to provide acceleration signals in two or more different ranges in a condition in which the signals are accurate thanks to the removal of the drift components therefrom. In addition, plural-range acceleration signals can be outputted as a single time-serial digital signal DS, as pictorially shown in FIG. 2.

In the present embodiment, the processing circuit for processing the output of the acceleration transducer 1 can be formed on the single semiconductor chip 2 incorporated in the sensor package 3 together with the acceleration transducer 1. This packaging structure makes the acceleration sensor 10 compact.

Further, of the signal detected by the acceleration transducer 1, lower-level signal components are subjected to removal of drift components carried out by both of the digital high-pass filer 24 and the D/A converter 25. It is therefore possible to cause the acceleration sensor 10 to output both of a higher-level acceleration signal component and a lower-level acceleration signal component as two types of signals almost equal to each other with respect to precision.

When the acceleration sensor 10 is employed by a on-vehicle side-impact airbag system, it is possible to allow the single acceleration sensor 10 and the single signal line connected to the sensor to simultaneously provide both the main sensor signal and the safing sensor signal. The number of acceleration sensors mounted to the vehicle can thus be reduced and the amounts of wiring, or harness connecting each acceleration sensor and the airbag ECU can be lessened as well. The output from the acceleration sensor 10 is provided as the digital format signal, so that the on-vehicle airbag system is able to have a high resistance to noise.

One example modified from the first embodiment is that a plurality of pairs each composed of the second amplifier 21, which receives the output signal from the first amplifier 20, and the drift correcting circuit is provided in parallel to the first amplifier 20 and the multiplexer 22 is configured to sequentially switch plural inputs for the output of the switched one, the plural inputs corresponding to the number of amplifiers. This provides a system in which three or more different-range acceleration signals can be outputted as a single time-serial digital signal.

(Second Embodiment)

Figure 4:
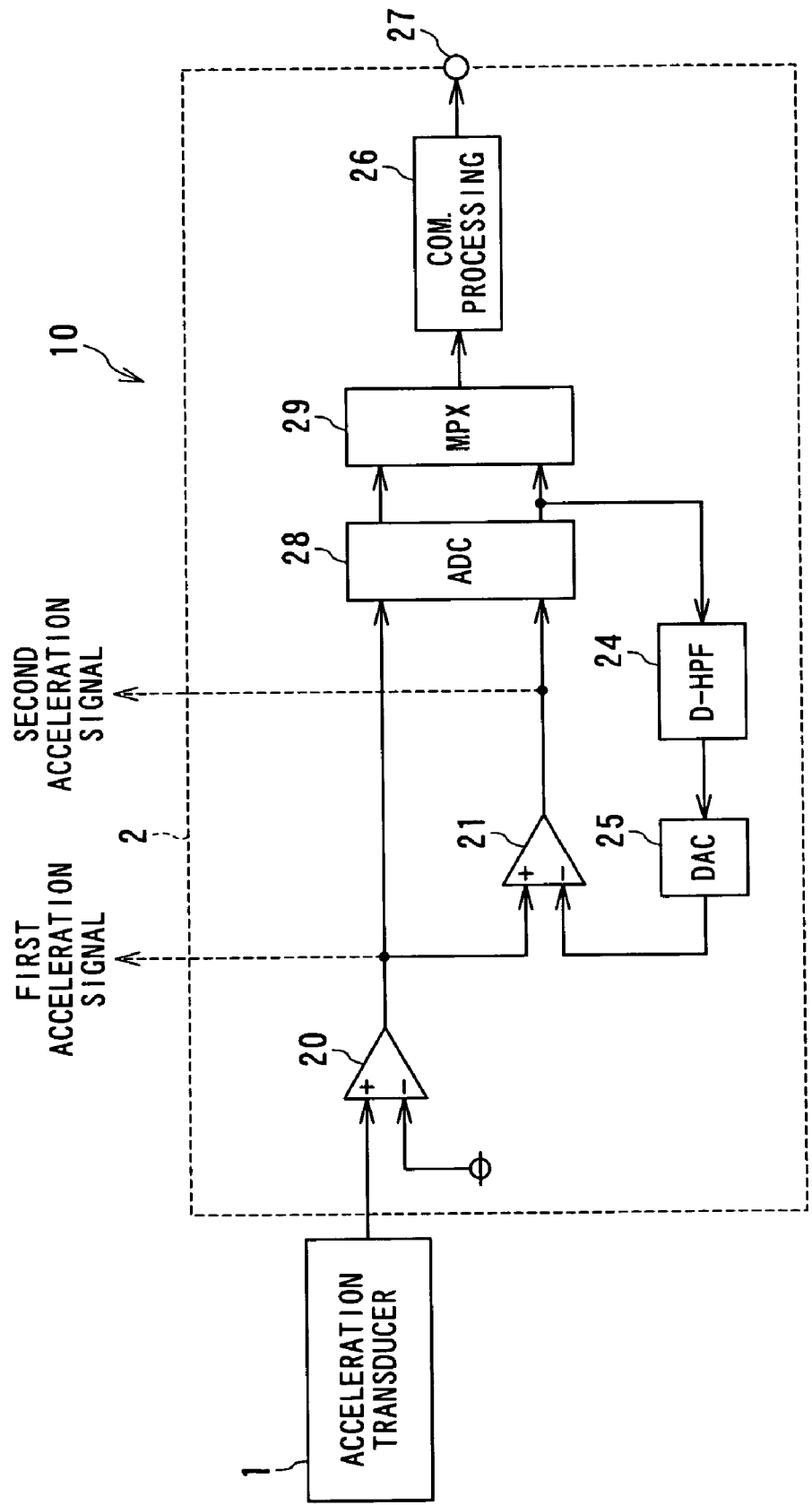
FIG. 4 is a block diagram showing the circuitry of an acceleration sensor serving as the physical quantity sensor according to a second embodiment of the present invention.

Referring to FIG. 4, a second embodiment of the acceleration sensor according to the present invention will now be described. In the second embodiment and subsequent embodiments, to omit redundant explanations, the similar or identical components to those in the foregoing first embodiment will be represented by the same reference numerals.

The present embodiment features the processing circuit processing the output signal from the acceleration transducer 1. The processing is formed differently from that explained in the first embodiment, which is as follows.

As shown in FIG. 4, the acceleration sensor 10, which serves as the physical quantity sensor according to the present invention, is different from that in the first embodiment in the arrangement order of circuits composing the A/D converting circuit of the present invention. Specifically, the A/D converting circuit is made up of an A/D converter 28 and a multiplexer 29, both of which are mutually connected in an arrangement order opposite to that in the first embodiment.

The A/D converter 28, which has two channels for the conversion, is located before the multiplexer 29 and receives both the first and second acceleration signals outputted from the first and second amplifiers 20 and 21, respectively. The A/D converter 28 then separately converts the first and second acceleration signals into a first digital signal and a second digital signal, the first and second digital signals being supplied to the multiplexer 29 through the different channels.

The multiplexer 29 receives both the first and second digital signals by alternately switching its input terminals one from the other at predetermined cycles so as to produce single time-serial digital signal. This signal is sent to the communication processing circuit 26 as a two-different-range acceleration signal. Additionally, of the first and second digital signals from the A/D converter 28, the second digital signal is supplied solely to the digital high-pass filter 24.

The A/D converting circuit, which is composed of the two-channel A/D converter 28 and the multiplexer 29, operates in the similar manner to that in the first embodiment. That is, both the first acceleration signal and the second acceleration signal are separately supplied to the A/D converter 28, the first one being not only outputted from the first amplifier 20 receiving the output of the acceleration transducer 1 but also inputted to the second amplifier 21, whist the second one being outputted from the second amplifier 21 where the first acceleration signal being amplified at the second gain.

Thus, like the first embodiment, the circuitry in the second embodiment permits the second acceleration signal to be subject to the negative feedback to the second amplifier 21 via the digital high-pass filer 24 and the D/A converter 25 in turn. Through this negative feedback, drift components included in the second acceleration signal are removed therefrom. It is therefore possible to provide a high-precision low-level acceleration signal outputted from the second amplifier 21, together with a high-level acceleration signal outputted from the first amplifier 20. Namely, the two different-range acceleration signals can be obtained as a single train of signals outputted in a time serial manner.

In the second embodiment, like the first embodiment, the processing circuit is formed on the semiconductor chip 2, thus making the acceleration sensor 10 more compact.

(Third Embodiment)

Figure 5:
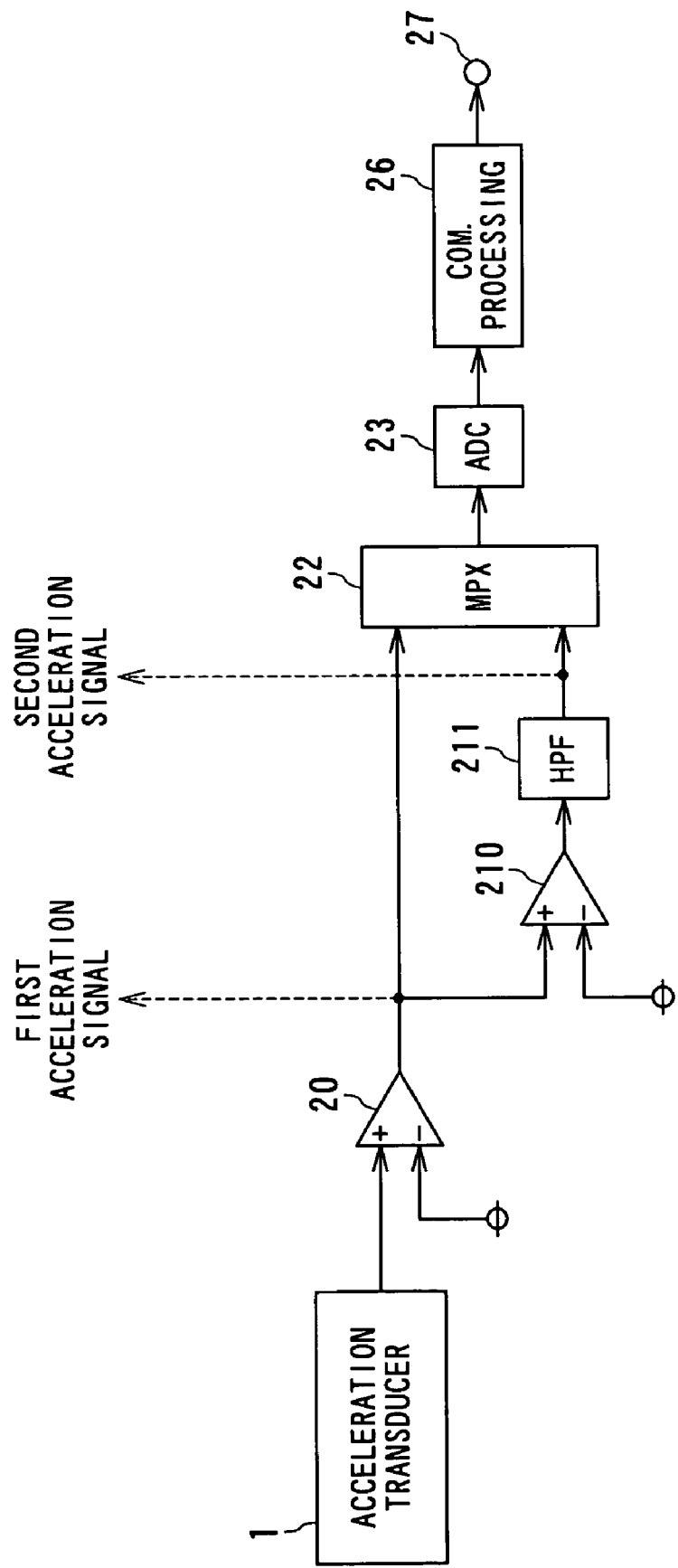
FIG. 5 is a block diagram showing the circuitry of an acceleration sensor serving as the physical quantity sensor according to a third embodiment of the present invention.

Referring to FIG. 5, a third embodiment of the acceleration sensor according to the present invention will now be explained.

An acceleration sensor 10 according to the third embodiment is shown in a block form in FIG. 5, in which, instead of the foregoing second amplifier 21, there is placed a second amplifier 210 having a gain of 7.5, which serves the second gain of the present invention. The output terminal of the second amplifier 210 is directly connected to a high-pass filter 211. Both of the digital high-pass filter 24 and the D/A converter 25, which have been explained in the foregoing embodiments, are removed from the circuitry.

The high-pass filter 211 removes drift signal components from the analog-amount output signal from the second amplifier 210. The drift signal components belong to a low frequency band lower in frequency than the cutoff frequency (0.1 Hz) given to the high-pass filter 211. The drift-removed high-passed signal from the filter 211 is supplied as a second acceleration signal to the multiplexer 22.

In this circuitry, the high-pass filter 211 corresponds to the drift correcting circuit according to the present invention.

For receiving both the output signals from the high-pass filter 211 and the first amplifier 20, the multiplexer 22 alternately switches the two signals one from the other at predetermined cycles to produce a single train of signals aligned in a time serial manner. Those signals are sent to the A/D converter 23 so that corresponding digital signals are produced and then sent to the communication processing circuit 26.

Though the drift correction unit in the present embodiment is different from the first embodiment, a single train of digital signals is produced in a similar manner to the first embodiment. That is, like the first embodiment, the multiplexer 22, which is part of the A/D converting circuit, receives both the first acceleration signal (which is the output signal from the first amplifier 20 and also sent as an input signal to the second amplifier 210) and the second acceleration signal (which is produced by removing low-frequency signal components from the output signal of the second amplifier 210). The multiplexer 22 switches alternately the two inputs to select either the first or second acceleration signal. The selected signal undergoes an A/D conversion by the A/D converter 23 to produce a single time train of digital signals corresponding to the first and second acceleration signals.

In the present embodiment, the drift signal components are therefore removed from the output (i.e., the second accelerations signal) of the second amplifier 210 without fail. As a result, the single acceleration sensor is able to provide a high-level acceleration signal as well as an accurate low-level acceleration signal.

In addition, the number of circuits can be lessened (i.e., the D/A converter 25 shown in FIGS. 2 and 4 can be omitted from the circuitry), simplifying the circuitry as a whole.

(Fourth Embodiment)

Figure 6:
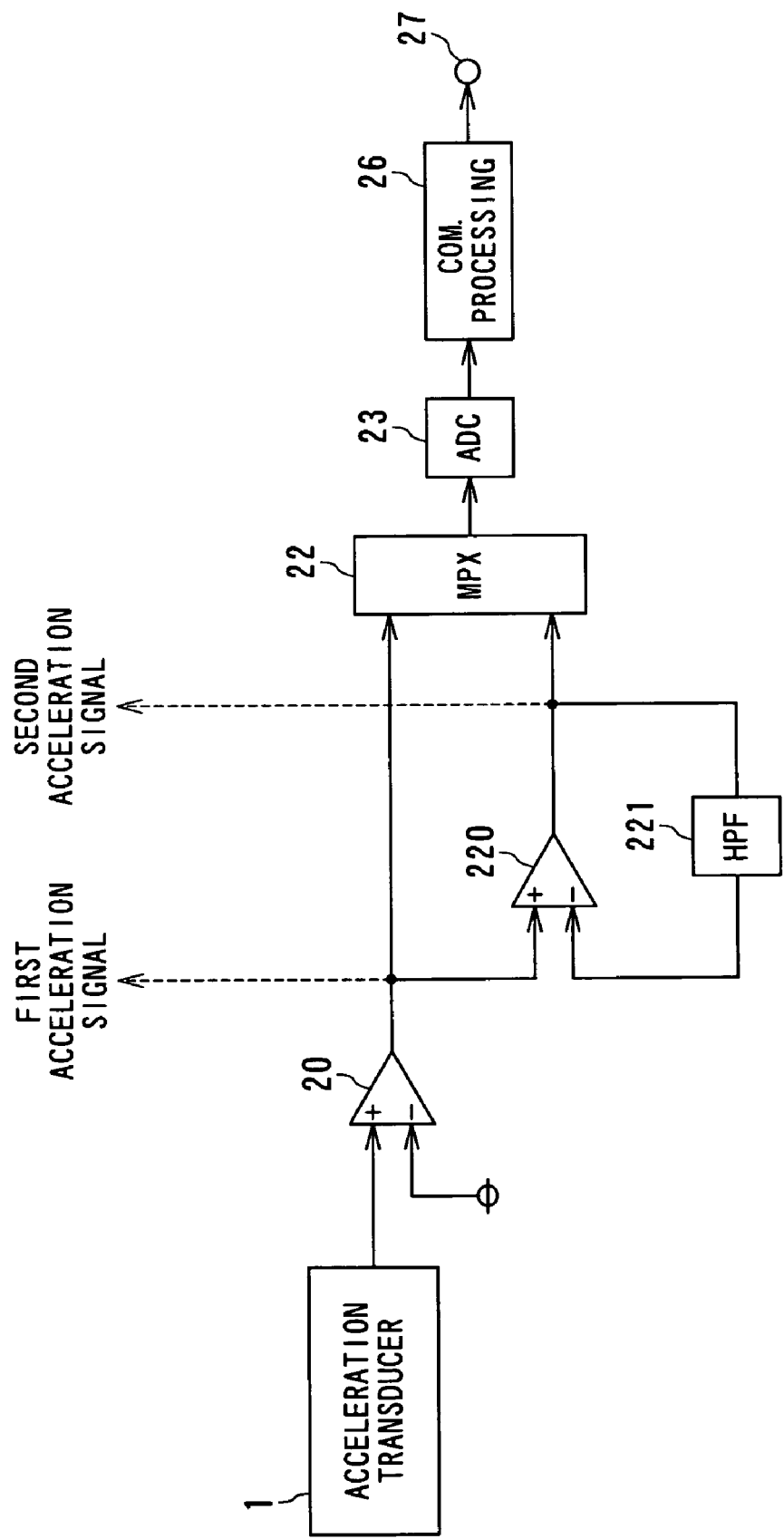
FIG. 6 is a block diagram showing the circuitry of an acceleration sensor serving as the physical quantity sensor according to a fourth embodiment of the present invention.

Referring to FIG. 6, a fourth embodiment of the acceleration sensor according to the present invention will now be explained.

An acceleration sensor 10 according to the fourth embodiment is shown in a block form in FIG. 6, in which, instead of the foregoing second amplifier 21, there is placed a second amplifier 220 having a gain of 7.5, which serves the second gain of the present invention. The output terminal of the second amplifier 220 is directly connected to both a high-pass filter 221 and the multiplexer 22. Both of the digital high-pass filter 24 and the D/A converter 25, which have been explained in the first and second embodiments, are removed from the circuitry.

The high-pass filter 221 removes low-frequency signal components from the analog-amount output signal from the second amplifier 220. The low-frequency signal components are lower in frequency than the cutoff frequency (0.1 Hz) given to the high-pass filter 221. The high-passed signal from the filter 221 is supplied to the second amplifier 220 in a negative feedback manner.

In this sensor configuration, the high-pass filter 221 composes the drift correcting circuit according to the present invention.

Though the drift correction unit in the present embodiment is different from the first embodiment, a single train of digital signals is produced in a similar manner to the first embodiment. That is, like the first embodiment, the multiplexer 22, which is part of the A/D converting circuit, receives both the first acceleration signal (which is the output signal from the first amplifier 20 and also sent as an input signal to the second amplifier 220) and the second acceleration signal (which is produced by removing low-frequency signal components from the output signal of the second amplifier 220). The multiplexer 22 switches alternately the two inputs to select either the first or second acceleration signal. The selected signal undergoes an A/D conversion by the A/D converter 23 to produce a single time train of digital signals corresponding to the first and second acceleration signals.

In the present embodiment, the drift signal components are therefore removed from the output (i.e., the second accelerations signal) of the second amplifier 220 without fail. As a result, the single acceleration sensor is able to provide a high-level acceleration signal as well as an accurate low-level acceleration signal.

In addition, like the third embodiment, the number of circuits can be lessened (i.e., the D/A converter 25 shown in FIGS. 2 and 4 can be omitted from the circuitry), simplifying the circuitry as a whole.

(Fifth Embodiment)

Figure 7:
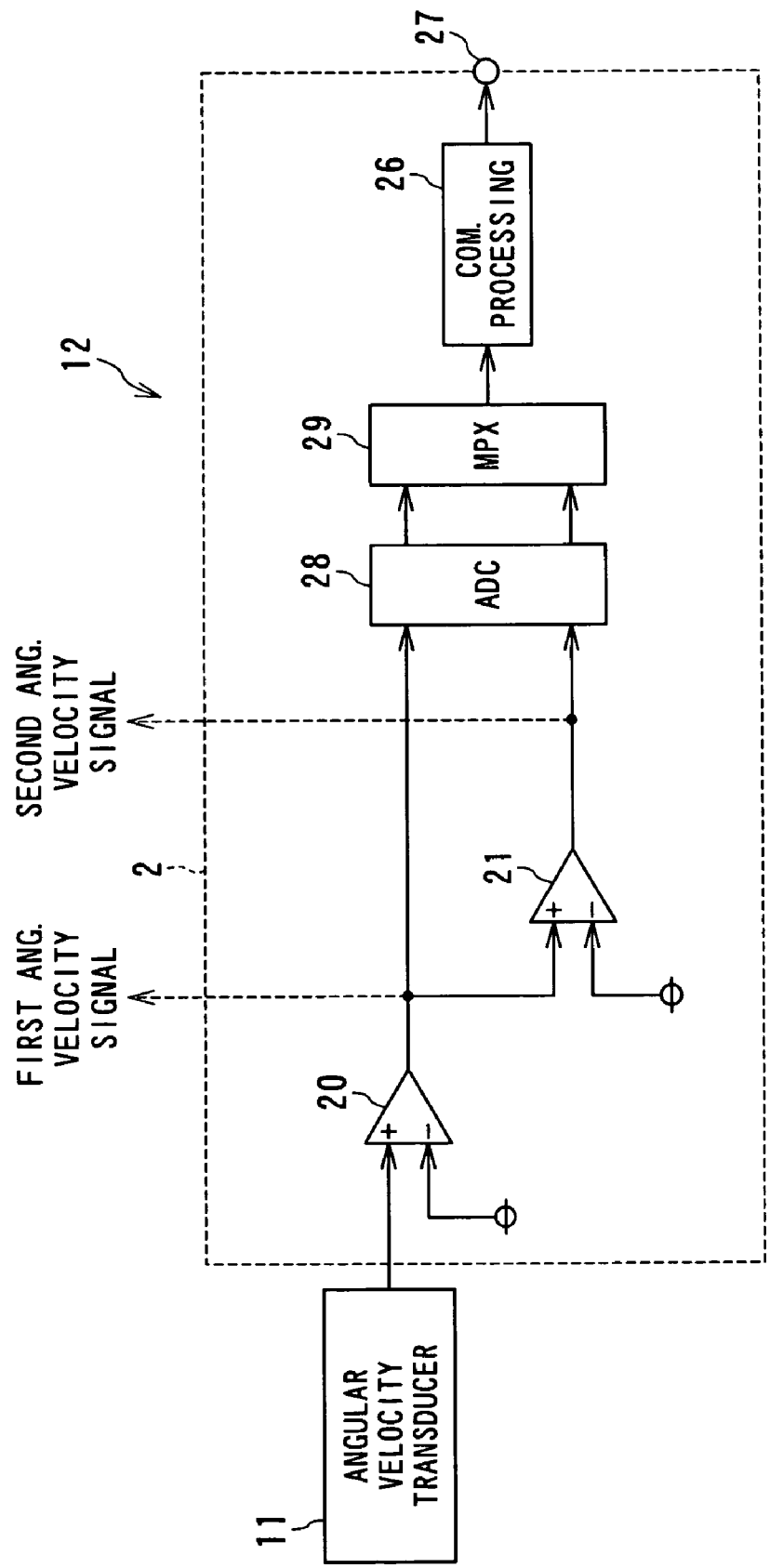
FIG. 7 is a block diagram showing the circuitry of an angular velocity sensor serving as the physical quantity sensor according to a fifth embodiment of the present invention.

Referring to FIG. 7, a fifth embodiment of the physical quantity sensor according to the present invention will now be explained.

The present embodiment features an angular velocity sensor serving as the physical quantity sensor according to the present invention. The angular velocity sensor adopts an angular velocity transducer corresponding to the physical quantity transducer according to the present invention.

As shown in FIG. 7, an angular velocity transducer 11 is provided of which output terminal is electrically connected to the input of the semiconductor chip 2 that is part of an angular velocity sensor 12.

Of these components, the angular velocity transducer 11 is formed into a known structure, which has a rotation axis (i.e., one detection axis) and detects, in an electric signal, angular velocity along a circle on a plane perpendicular to the rotation axis. The angular velocity transducer 11 can be arranged at, for example, the gravity position of a vehicle in such a manner that the rotation axis of the transducer 11 is directed in a longitudinal direction at the gravity position. By this arrangement, the output signal from the transducer 11, which is indicative of the angular velocity at the gravity position, can be obtained as a signal indicating a yaw rate of the vehicle. The yaw rate signal can be used for motion control of the vehicle.

On the other hand, the semiconductor chip 2, which is structured in the similar manner to that shown in FIGS. 1A and 1B, provides as a semiconductor circuit the circuitry shown in FIG. 7. This circuitry is for processing an output signal from the angular velocity transducer 11 and is formed similarly to that in FIG. 4, except that no drift correcting circuit is provided.

In the circuitry shown in FIG. 7, like the second embodiment, the first amplifier 20 and the second amplifier 21 are disposed on the input side of the circuitry. The output signals from both amplifiers 20 and 21 are provided to the A/D converting circuit. This unit is composed of the two-channel A/D converter 28 and the multiplexer 29. The output of the multiplexer 29 is routed to the sensor output terminal 27 via the communication processing circuit 26.

The operations in this sensor are summarized as follows. An output signal form the angular velocity transducer 11 is first amplified by the first amplifier 20 at a first gain given thereto, and a first angular velocity signal indicative of a detected angular velocity is outputted from the first amplifier 20. This first angular velocity signal is a signal corresponding to the detection of the angular velocity.

The first angular velocity signal is then sent to one of the two input terminals of the two-channel A/D converter 28 and also to the second amplifier 21. Hence the second amplifier 21 amplifies the inputted first angular velocity signal at a second gain thereto to produce a second angular velocity signal. This signal is also supplied to the remaining input terminal of the A/D converter 28.

The A/D converter 28 then A/D-converts both of the first and second angular velocity signals, respectively, to the first and second corresponding digital signals, both the digital signals being fed to the input terminals of the multiplexer 29. Similarly to the above, the multiplexer 29 alternately switches its inputs at predetermined cycles so that the first and second digital signals are combined into a single train of time-serial digital signal including the two-range angular velocity signals. This time-serial digital signal is then fed to the communication processing circuit 26.

As described above, in the fifth embodiment, both of the inputted signal to the second amplifier (that is, the first angular velocity signal directly corresponding to an output of the angular velocity transducer 11) and the output signal from the second amplifier 21 (that is, the second angular velocity signal) are fed to the A/D converting circuit. In addition, the first and second angular velocity signals from the first and second amplifiers 20 and 21 can be outputted as analog signals from this angular velocity sensor 12 in an appropriate manner, as shown by dashed lines in FIG. 7. The first and second gains to be given to the first and second amplifiers 20 and 21 can be decided depending on desired angular velocity ranges.

However, differently from the foregoing third embodiment explained with FIG. 5, no drift correcting circuit is provided in this fifth embodiment. As long as drift components caused at the angular velocity transducer 11 itself are as small as negligible, the circuitry according to the fifth embodiment is still enough. In other words, it is not always necessary to connect, to the output of the second amplifier 21, the drift correcting circuit such as a high-pass filter. Even though the circuitry shown in FIG. 7 has no drift correcting circuit, this circuit is able to output the second angular velocity signal as a high-precision low-level-range angular velocity signal.

As stated above, the angular velocity sensor 12 according to the present embodiment can use the angular velocity transducer 11 as a physical quantity sensor. That is, the output signal of the transducer 11, that is, the signal indicative of angular velocity (i.e., physical quantity) causing in a selected direction to the one detection axis of the transducer 11 can be transformed into two different-range angular velocity signals. These signals are then processed into a single time-serial digital signal in a combined form.

(Sixth Embodiment)

Figure 8:
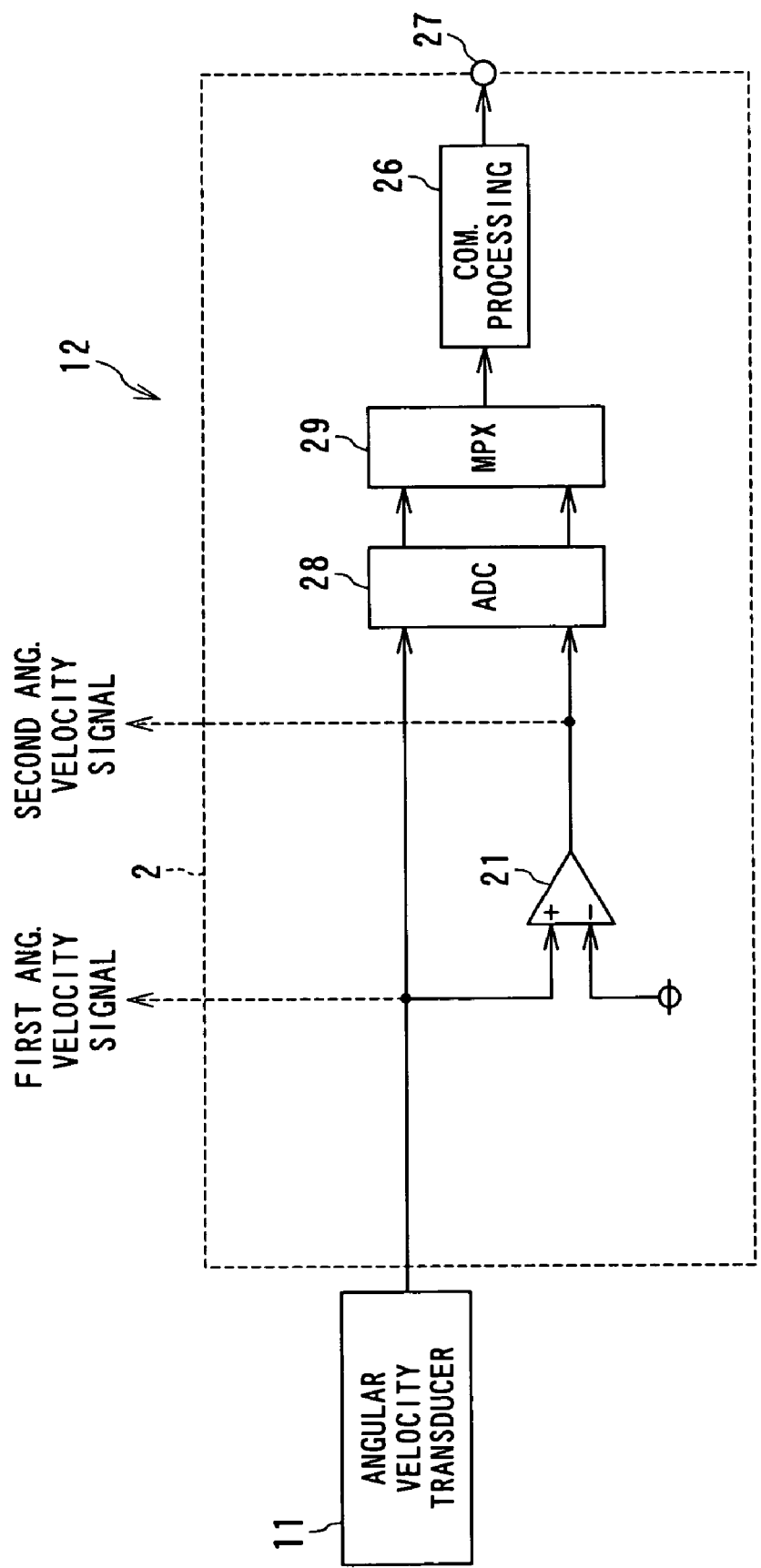
FIG. 8 is a block diagram showing the circuitry of an angular velocity sensor serving as the physical quantity sensor according to a sixth embodiment of the present invention.

Referring to FIG. 8, a sixth embodiment of the physical quantity sensor according to the present invention will now be explained.

The present embodiment also features an angular velocity sensor serving as the physical quantity sensor, but is different from the circuitry of the foregoing fifth embodiment in that the configuration for amplification is more simplified.

As shown in FIG. 8, an angular velocity sensor 12 is provided to have an angular velocity transducer 11 and a semiconductor chip 2. In the circuitry formed on the chip 2, the output of the transducer 11 is electrically connected through a line LN to both the noninverting input terminal of the second amplifier 21 and one of the two input terminals of the A/D converter 28 serving as part of the A/D converting circuit of the present invention. The line LN corresponds to the first circuit of the present invention.

In this circuitry, there is provided no amplifier which corresponds to the first amplifier 20 in FIG. 7. The only one amplifier, in other words, the second amplifier 21 is placed, of which output is also fed to the remaining input terminal of the A/D converter 28. Including the feature that no drift correcting circuit is provided, the remaining configuration is the same as to that in the fifth embodiment.

As a result, the output signal itself from the angular velocity transducer 11 is treated as the first angular velocity signal and directly supplied to both the A/D converter 28 and the second amplifier 21. The first angular velocity signal is amplified by the second amplifier 21 at the second gain thereof, which produces a second angular velocity to be sent to the A/D converter 28.

Hence, the A/D converter 28 receives both of the first angular velocity signal (i.e., the input signal to the second amplifier 21) and the second angular velocity signal (the output signal from the second amplifier 21). These first and second angular velocity signals can also be taken out of the sensor 12 as analog signals using an appropriate wiring configuration.

In the sixth embodiment, as understood from the above, the only one amplifier (i.e., the second amplifier 21) is arranged to amplify the output of the angular velocity transducer 11. This simplified circuitry is especially useful in cases where an output signal from the angular transducer 11 is relatively higher in a level to the extent that eliminates the need for using the two-stage amplification manner in acquiring a low-level angular velocity signal.

Accordingly, though the circuitry is more simplified compared to that in the fifth embodiment, the angular velocity sensor 12 of the sixth embodiment is able to output two different-range angular velocity signals in the form of a single time-serial digital signal, like the fifth embodiment.

(Seventh Embodiment)

Figure 9:
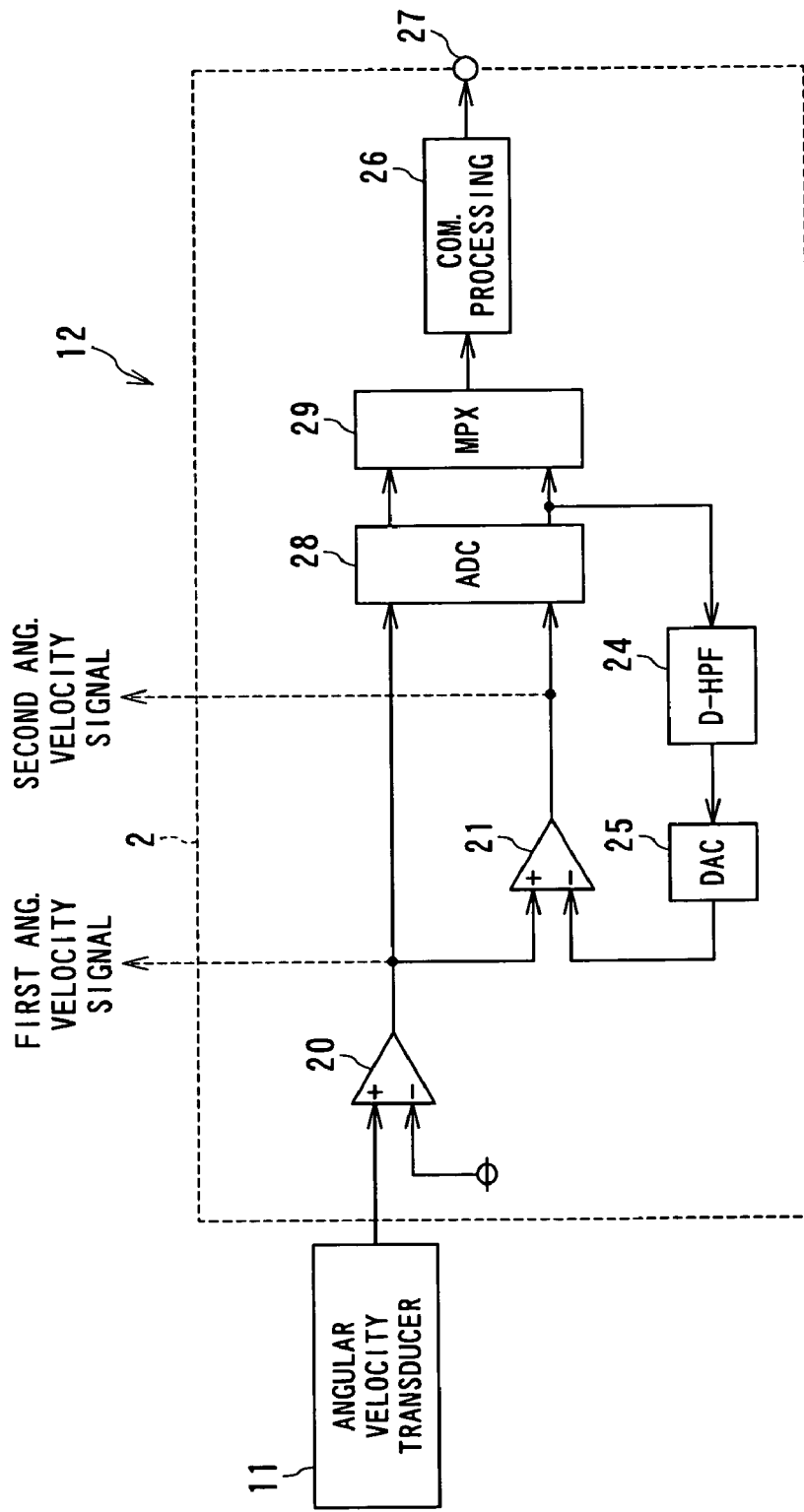
FIG. 9 is a block diagram showing the circuitry of an angular velocity sensor serving as the physical quantity sensor according to a seventh embodiment of the present invention.

Referring to FIG. 9, a seventh embodiment of the physical quantity sensor according to the present invention will now be explained.

The seventh embodiment is also explained about a configuration applied to an angular velocity sensor serving as the physical quantity sensor and produced into a combined form of the circuits shown in FIGS. 7 and 4.

As shown in FIG. 9, an angular velocity sensor 12 is provided with the angular velocity transducer 11 and the semiconductor chip 2 including the first and second amplifiers 20 and 21, two-channel A/D converter 28, two-channel multiplexer 29, communication processing circuit 26, sensor output terminal 27, digital high-pass filter 24 and D/A converter 25.

In the present embodiment, as explained in the second embodiment, the second angular velocity signal (i.e., the output signal from the second amplifier 21) is returned, as a negative feedback signal, to the inverting input terminal of the second amplifier 21 via the digital high-pass filter 24 and D/A converter 25, so that drift signal components are removed from the second angular velocity signal. It is therefore possible that a low-level angular velocity signal of high precision (i.e., less drifts), which is from the second amplifier 21, is obtained together with a high-level angular velocity signal, which is from the first amplifier 20. The two different-range angular velocity signals are produced as a single digital signal that flows in series in time.

Like the second embodiment, the processing circuit can be formed on the semiconductor chip 2, so that the angular velocity sensor can be made smaller in the size.

Other modifications can also be provided as below. The physical quantity sensor according to the present invention is not confined to the acceleration sensor and the angular velocity sensor, which have been described already. An alternative example is a pressure sensor, in which a pressure transducer, amplifier (the first and/or second amplifiers), A/D converting circuit, and/or drift correcting circuit is combined in the similar manners to those exemplified already. The pressure transducer is configured to sense pressure (or torque) acting in its detection axis direction and output an electrical signal corresponding to a magnitude of the sensed pressure. This pressure sensor is also able to output two different-range pressure signals (physical quantity signals) as a single time-serial digital signal.

The present invention may be embodied in other specific forms without departing from the spirit or essential characteristics thereof. The present embodiments are therefore to be considered in all respects as illustrative and not restrictive, the scope of the present invention being indicated by the appended claims rather than by the foregoing description and all changes which come within the meaning and range of equivalency of the claims are therefore intended to be embraced therein.

The entire disclosure of Japanese Patent Applications No. 2003-29599 filed on Feb. 6, 2003 and No. 2003-399932 filed on Nov. 28, 2003 including the specification, claims, drawings and summary is incorporated herein by reference in its entirety.

What is claimed is:

1. A physical quantity sensor comprising:
    a physical quantity transducer sensing a physical quantity acting on the physical quantity transducer by outputting an electrical detection signal corresponding to a magnitude of the physical quantity;
    a first amplifier amplifying the detection signal at a first gain given to the first amplifier to produce a first physical quantity signal depending in level on the detection signal;
    a second amplifier amplifying the first physical quantity signal at a second gain given to the second amplifier to produce a second physical quantity signal, the second physical quantity signal being larger in magnitude than the first physical quantity signal;
    a drift correcting circuit, which is made up of a digital filter, removing a drift signal component from the second physical quantity signal;
    a D/A converter D/A-converting the second physical quantity signal subjected to the removal of the drift signal component at the drift correcting circuit, whereby a D/A-converted second physical quantity signal is provided to the second amplifier;
    a multiplexer using both of the first physical quantity signal and the second physical quantity signal subjected to the removal of the drift signal component at the drift correcting circuit to produce a single signal consisting of the first and second physical quantity signals alternately selected and lined up sequentially in time; and
    an A/D converter applying A/D-conversion to both of the first physical quantity signal and the second physical quantity signal subjected to the removal of the drift signal component.

2. The physical quantity sensor according to claim 1, wherein the multiplexer is configured to alternately select the first and second physical quantity signals at predetermined cycles.

3. The physical quantity sensor according to claim 2, wherein the multiplexer is located to respectively receive the first and second physical quantity signals from the first and second amplifiers and the A/D converter is located to respectively apply the A/D conversion to both of the first and second physical quantity signals alternately selected by the multiplexer.

4. The physical quantity sensor according to claim 2, wherein the A/D converter is located to respectively receive the first and second physical quantity signals from the first and second amplifiers to apply the A/D conversion to both of the first and second physical quantity signals and the multiplexer is located to alternately select the first and second physical quantity signals respectively subjected to the A/D conversion by the A/D converter.

5. The physical quantity sensor according to claim 4, wherein the A/D converter has two input channels to receive the first and second physical quantity signals, respectively.

6. The physical quantity sensor according to claim 1, wherein the digital filter is a high-pass filter configured to pass only signal components of the second physical quantity signal which are higher than a predetermined frequency.

7. The physical quantity sensor according to claim 6, wherein the second amplifier is a differential amplifier having a reference input and the high-pass filter is located to have an output signal therefrom negatively fed back to the reference input of the differential amplifier.

8. The physical quantity sensor according to claim 6, wherein the high-pass filter is located between the D/A converter and the A/D converter.

9. The physical quantity sensor according to claim 1, wherein the second amplifier is a differential amplifier and the digital filter consists of a digital high-pass filter whose input is connected to the A/D converter to receive the digital second physical quantity signal, the high-pass filter passing only signal components of the second physical quantity signal which are higher than a predetermined frequency, and the D/A converter arranged between an output of the digital high-pass filter and a reference input of the differential amplifier so that the second physical quantity signal subjected to the high-pass filtering is negatively fed back to the differential amplifier.

10. The physical quantity sensor according to claim 1, wherein the the first and second amplifiers, the multiplexer, and the drift correcting circuit are formed as a semiconductor circuit on a one semiconductor chip and the physical quantity transducer is mounted on the semiconductor chip, the semiconductor chip being enclosed with a package with the physical quantity transducer placed therein.

11. The physical quantity sensor according to claim 1, wherein the physical quantity sensed by the physical quantity transducer is one of acceleration, angular velocity and pressure acting on a vehicle.

12. The physical quantity sensor according to claim 1, wherein the first amplifier is a differential amplifier having a detection input receiving the detection signal from the transducer and a reference input to which a reference-level signal is given, whereby the detection signal is compared in level with the reference signal so as to produce the first physical quantity signal.

13. A physical quantity sensor comprising:
a physical quantity transducer sensing a physical quantity acting on the physical quantity transducer by outputting an electrical detection signal corresponding to a magnitude of the physical quantity;
a first amplifier amplifying the detection signal at a first gain given to the first amplifier to produce a first physical quantity signal depending in level on the detection signal;
a second amplifier, which is made up of a differential amplifier, amplifying the first physical quantity signal at a second gain given to the second amplifier to produce a second physical quantity signal, the second physical quantity signal being larger in magnitude than the first physical quantity signal;
a high-pass filter, which is connected to an output terminal of the differential amplifier composing the second amplifier, removing a drift signal component from the second physical quantity signal by passing only signal components of the second physical quantity signal which are higher than a predetermined frequency, wherein the high-pass filter is located to have an output signal therefrom negatively fed back to a reference input of the differential amplifier composing the second amplifier;
a multiplexer, which receives both of the first physical quantity signal and the second physical quantity signal subjected to the removal of the drift signal component at the high pass filter, alternately selecting, at predetermined cycles, the first physical quantity signal and the second physical quantity signal to produce a single signal consisting of the first and second physical quantity signals alternately selected and lined up sequentially in time; and
an A/D converter performing an A/D conversion on the single signal consisting of both the first physical quantity signal and the second drift-removed physical quantity signal, thereby the single signal being outputted as a single digital signal.

14. The physical quantity sensor according to claim 13, wherein the physical quantity sensed by the physical quantity transducer is one of acceleration, angular velocity and pressure acting on a vehicle.

15. The physical quantity sensor according to claim 13, wherein the first and second amplifiers, the multiplexer, and the high pass filter are formed as a semiconductor circuit on a one semiconductor chip and the physical quantity transducer is mounted on the semiconductor chip, the semiconductor chip being enclosed with a package with the physical quantity transducer placed therein.

16. A physical quantity sensor comprising:
a physical quantity transducer sensing a physical quantity acting on the physical quantity transducer by outputting an electrical detection signal corresponding to a magnitude of the physical quantity;
a first amplifier amplifying the detection signal to produce a first physical quantity signal depending in level on the detection signal;
a second amplifier, which is made up of a differential amplifier, amplifying the first physical quantity signal at a second gain given to the second amplifier to produce a second physical quantity signal, the second physical quantity signal being larger in magnitude than the first physical quantity signal;
a drift correcting circuit, which is made up of a digital filter, removing a drift signal component from the second physical quantity signal;
a multiplexer, which receives both of the first physical quantity signal and the second physical quantity signal subjected to the removal of the drift signal component at the drift correcting circuit, alternately selecting, at predetermined cycles, the first physical quantity signal and the second physical quantity signal to produce a single signal consisting of the first and second physical quantity signals alternately selected and lined up sequentially in time;
an A/D converter performing an A/D conversion on both of the first physical quantity signal and the second drift-removed physical quantity signal, thereby the single signal being outputted in a form of a single digital signal; and wherein the drift correcting circuit consists of a digital high-pass filter whose input is connected to the A/D converter to receive the digital second physical quantity signal, the high-pass filter passing only signal components of the second physical quantity signal which are higher than a predetermined frequency, and a D/A converter arranged between an output of the digital high-pass filter and a reference input of the differential amplifier so that the second physical quantity signal subjected to the high-pass filtering is negatively fed back to the differential amplifier.

17. The physical quantity sensor according to claim 16, wherein the physical quantity sensed by the physical quantity transducer is one of acceleration, angular velocity and pressure acting on a vehicle.

18. The physical quantity sensor according to claim 16, wherein the first and second amplifiers, the multiplexer, and the drift correcting circuit are formed as a semiconductor circuit on a one semiconductor chip and the physical quantity transducer is mounted on the semiconductor chip, the semiconductor chip being enclosed with a package with the physical quantity transducer placed therein.

* * * * *